United States Patent [19]
Chang

[11] Patent Number: 5,735,193
[45] Date of Patent: Apr. 7, 1998

[54] FOOD PROCESSOR

[76] Inventor: Po Feng Chang, No. 9, An Shuen N. 2St, Pei Tung Dist, Tai-Chung City, Taiwan

[21] Appl. No.: 883,854

[22] Filed: Jun. 27, 1997

[51] Int. Cl.$^6$ .............. A23N 1/00; A47J 43/046; A47J 43/07; B02C 18/16
[52] U.S. Cl. .............. 99/494; 99/510; 241/37.5; 241/92; 241/282.1
[58] Field of Search .............. 99/492, 494, 495, 99/484, 509–513, 537, 588; 83/167, 356.2, 437.7, 932; 241/37.5, 92, 94, 282.1, 282.2, 100, 273.1, 292.1

[56] References Cited

U.S. PATENT DOCUMENTS

| | | | |
|---|---|---|---|
| 4,186,543 | 2/1980 | Lyell | 83/356.2 X |
| 4,240,338 | 12/1980 | McClean | 241/92 X |
| 4,471,915 | 9/1984 | Levin et al. | 99/492 X |
| 4,517,888 | 5/1985 | Gould | 366/314 X |
| 4,542,857 | 9/1985 | Akasaka | 241/282.1 X |
| 4,744,522 | 5/1988 | Borgmann et al. | 241/92 |
| 4,921,175 | 5/1990 | Okada et al. | 366/601 X |
| 5,156,084 | 10/1992 | Lin | 99/484 X |
| 5,320,031 | 6/1994 | Whitney | 99/495 X |
| 5,421,248 | 6/1995 | Hsu | 99/512 |
| 5,433,144 | 7/1995 | Lee | 99/513 X |
| 5,445,332 | 8/1995 | Shimizu et al. | 241/100 |
| 5,454,299 | 10/1995 | Gonneaud | 99/492 |

*Primary Examiner*—Timothy F. Simone
*Attorney, Agent, or Firm*—Bacon & Thomas

[57] ABSTRACT

A food processor includes a lower bowl, a mediate bowl disengagably mounted to the lower bowl, a disk mounted to the mediate bowl, a cap mounted to the disk and a shaft with a spring mounted thereto extending through the cap with a first end thereof and extending in the mediate bowl with a second end thereof so as to connect a fixing plate. The mediate bowl has a slit defined in a bottom thereof and a scrapping blade fixedly disposed to the bottom adjacent the slit. A crank member is securely connected to and rotates the other end of the shaft extending from the cap so as to rotate the shaft to scrap a large ice cube securely pressed between the bottom and the fixing plate by the scrapping blade. The shaft can alternatively rotate a blade device rotatably mounted to the lower bowl when the mediate bowl is removed.

7 Claims, 4 Drawing Sheets

FOOD PROCESSOR

BACKGROUND OF THE INVENTION

1. Field of the Invention

The present invention relates to a food processor and, more particularly, to an improved food processor having two actuating shafts which are selectably engaged with a crank member so as to operate the processor with different speed, and a mediate bowl having a blade to scrap a large ice cube.

2. Brief Description of the Prior Art

Most of food processors are driven by a motor disposed thereto so that the weight of the food processor is so heavy that it is not convenient for transportation especially when used outdoors. In addition, it needs electrical power to drive the conventional food processors so that once the food processors are used in some conditions having no electrical power, the functions of the food processors are therefore never be performed. Manual food processors have only simple functions and can not adjust operation speed thereof.

The present invention intends to provide an improved food processors to mitigate and/or obviate the abovementioned problems.

SUMMARY OF THE INVENTION

In accordance with on aspect of the present invention, there is provided a food processor comprising a lower bowl which has a protrusion extending from an inner side of a first bottom thereof for a blade means rotatably mounted thereto. A mediate bowl having a second bottom and a second peripheral wall is mounted to a first peripheral wall of the lower bowl. A slit is defined in the second bottom and a scrapping blade is fixedly and inclinedly disposed to the second bottom wherein a sharp edge of the scrapping blade extends above an inner side of the second bottom and is located adjacent to the slit. An outer peripheral wall is disposed around the second peripheral wall with a plurality of connecting plates connecting between the second peripheral wall and the outer peripheral wall which is mounted to the first peripheral wall.

A disk is disengagably mounted to the mediate bowl and has a central hole defined therethrough. A cap is mounted to the disk and has a first hole defined therethrough. A first shaft having a polygonal cross section has a first end extending through the first hole and a second end extending through the central hole so as to connect a fixing plate to the second end of the first shaft. A flange extends radially from the first shaft so that a spring is mounted to the first shaft and biasedly disposed between the flange and an inner flange extending inwardly and radially from an inner periphery defining the first hole.

A crank member has a first end with a first polygonal recess defined therein so as to securely mount to the first end of the first shaft and rotate the shaft.

It is an object of the present invention to provide a food processor having a mediate bowl which has a slit defined in a bottom thereof and a scrapping blade disposed to the bottom so as to scrap an ice cube by the scrapping blade.

It is another object of the present invention to provide a food processor wherein the mediate bowl has a plurality of connecting plates with holes defined therethrough so as to put seasoning thereon which drops on the scrapped ice.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
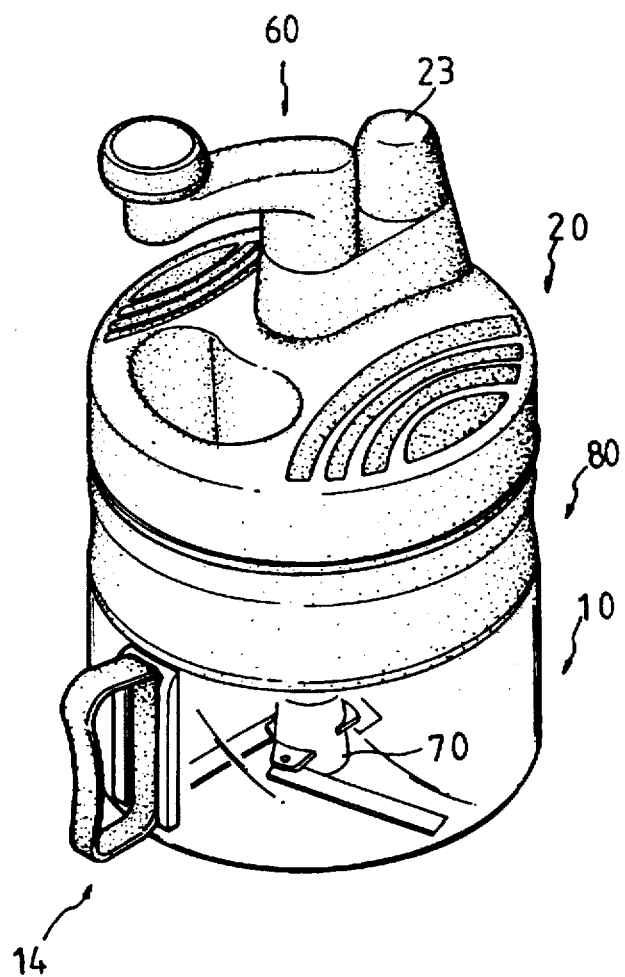
FIG. 1 is a perspective view of a food processor in accordance with the present invention.
Figure 2:
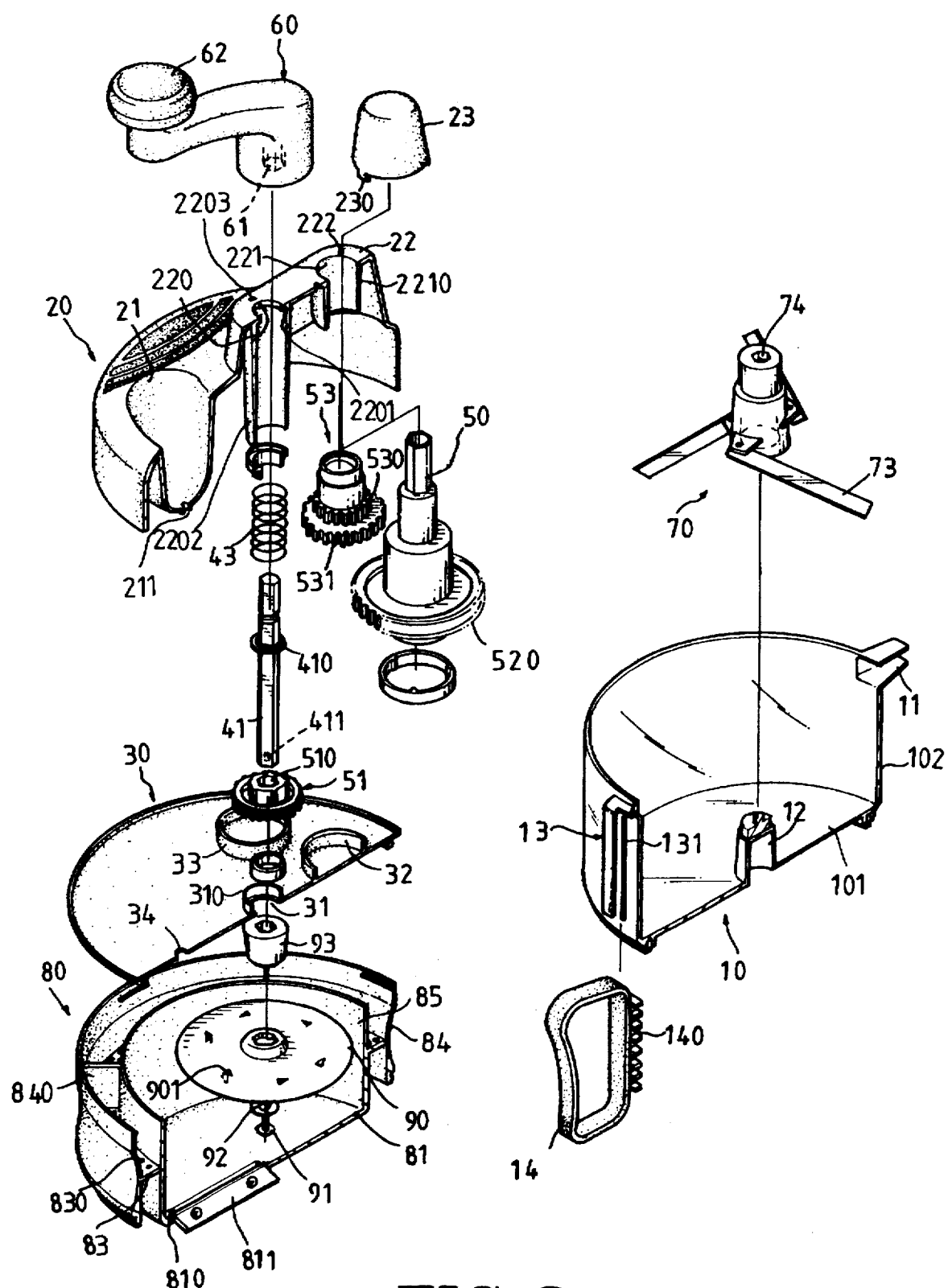
FIG. 2 is an exploded view of the food processor in accordance with the present invention.
Figure 3:
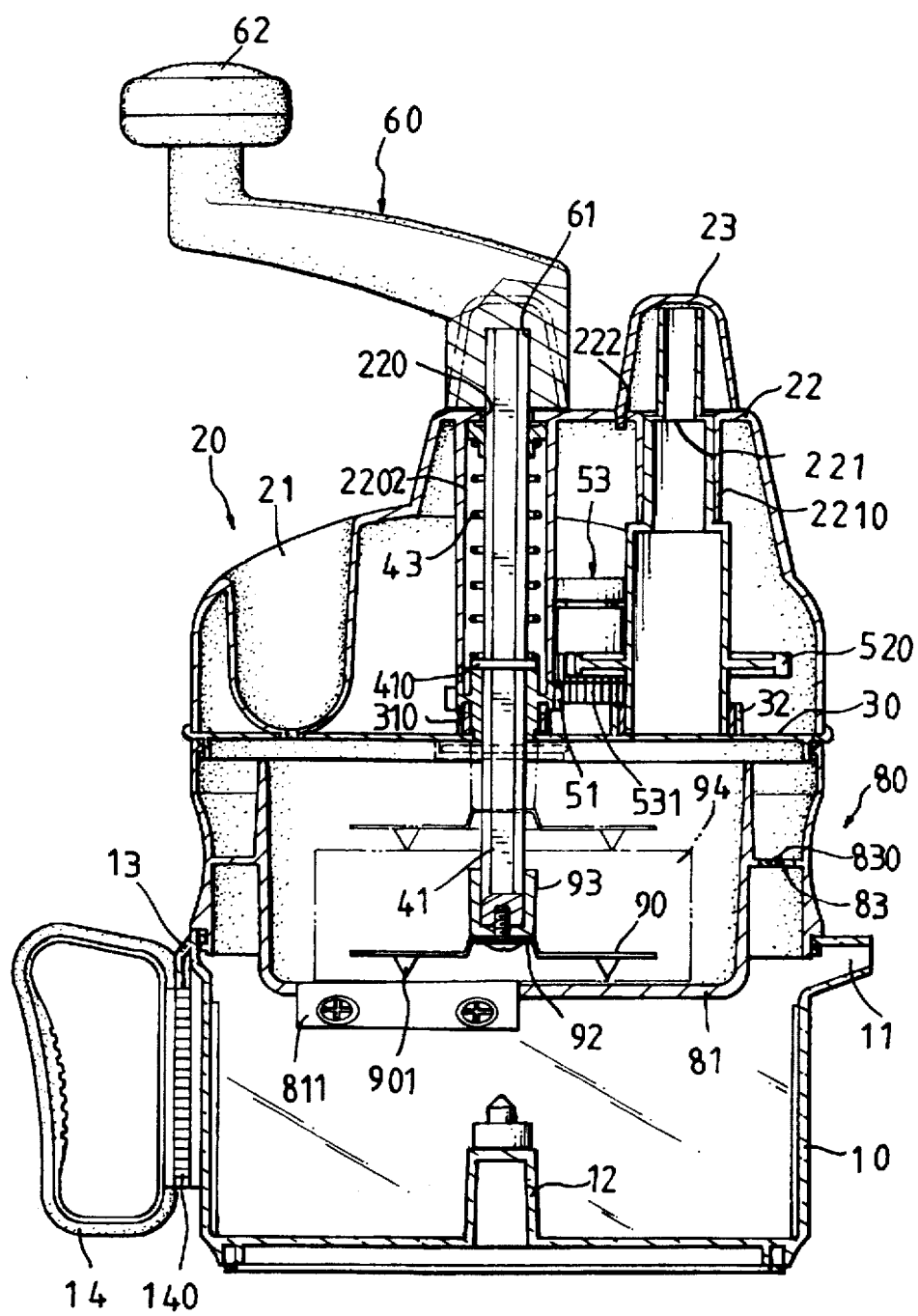
FIG. 3 is a side elevational view, partly in section, of the food processor of the present invention.

Referring to the drawings and initially to FIGS. 1 through 3, a food processor in accordance with the present invention generally includes a lower bowl 10 having a first bottom 101 and a first peripheral wall 102 extending from the bottom 101 which has a protrusion 12 extending from an inner side thereof for a blade means 70 rotatably mounted thereto. The blade means 70 can be equipped with different blades 73 for performing different functions. A pouring outlet 11 is defined in the first peripheral wall 102. The first peripheral wall 102 has an inverted U-shaped bracket 13 disposed to the outer periphery thereof. The bracket 13 has an open bottom end and a space is defined between the first peripheral wall 102 and the bracket 13. At least one tapered rib 131 extends from the outer periphery of the first peripheral wall 102. A handle 14 is disengagably attached to an outer periphery the first peripheral wall 102 wherein the handle 14 has a plurality of T-shaped members 140 extending laterally therefrom so that the T-shaped members 140 are inserted into the space from the open bottom of the bracket 13 and securely positioned between the tapered rib 131 and an inner side of the bracket 13.

A mediate bowl 80 has a second bottom 81 and a second peripheral wall 82 extending from the second bottom 81. A slit 810 is defined in the second bottom 81 and a scrapping blade 811 is fixedly and inclinedly disposed to the second bottom 81 wherein a sharp edge of the scrapping blade 811 extends above an inner side of the second bottom 81 and is located adjacent to the slit 810. An outer peripheral wall 84 is disposed around the second peripheral wall 82 with a plurality of connecting plates 83 connecting between the second peripheral wall 82 and the outer peripheral wall 84 which is mounted to the first peripheral wall 102. Each of the connecting plates 83 extends perpendicularly to the outer peripheral wall 84 and the second peripheral wall 82, a plurality of holes 830 defined in each of the connecting plates 83. A plurality of separating plates 840 are connected between the outer peripheral wall 84 and the second peripheral wall 82 so as to define a plurality of rooms. Each of the rooms can be added a seasoning, strawberry jam, for example, which will drop through the holes 830 and into the lower bowl 10.

A disk 30 is disengagably mounted to the outer peripheral wall 84 of the mediate bowl 80 and has a central hole 31 defined therethrough. A first collar 310 extends upwardly from the disk 30 and encloses the central hole 31, a second and a third collar 32, 33 respectively extending upwardly from the disk 30 and located beside the first collar 310. A cap 20 is mounted to the disk 30 and has a raised portion 22 through which a first hole 220 and a second hole 221 are respectively defined. Two tubes 2202, 2210 respectively extend from an respective inner periphery defining the first hole 220 and the second hole 221. An inner flange 2201 extends inwardly and radially from the inner periphery defining the first hole 220. At least two small holes 222/2203 are defined in a top of the raised portion 22 and are respectively located around the first hole 220 and the second hole 221 for a hat member 23 selectably and securely cover the first and the second hole 220, 221 by inserting at least two protrusions 230 thereof into the small holes 222/2203. The cap 20 has a recess 21 defined therein which has a first aperture 211 defined through a bottom thereof and the disk 30 as a second aperture 34 defined therethrough which communicates with the first aperture 211 when the cap 20 is mounted to the disk 30.

A first shaft 41 has a polygonal cross section and has a first end extending through the first hole 220 of the cap 20 and a second end extending through the central hole 31 of the disk 30. The second end of the first shaft 41 extends through a block 93 and a fixing plate 90 which is then disengagably connected to the second end of the first shaft 41 by extending a bolt 91 through a washer 92 and engaged with a threaded hole 411 defined in the second end of the first shaft 41. The fixing plate 90 has a plurality of sharp protrusions 901 extending from a lower side thereof so as to securely position and press a large ice cube 94 between the second bottom 81 of the mediate bowl 80 and the fixing plate 90. A flange 410 extends radially from the first shaft 41 so that a spring 43 is mounted to the first shaft 41 and biasedly disposed between the flange 410 and the inner flange 2201 extending inwardly and radially from an inner periphery defining the first hole 220 such that the first shaft 41 is biasedly toward the ice cube 94.

A crank member 60 has a first end with a first polygonal recess 61 defined therein so as to securely mount to the first end of the first shaft 41 and a second end with a ball member 62 rotatably disposed thereto.

Accordingly, when rotating the crank member 60, the fixing plate 90 together with the ice cube 94 are rotated with the first shaft 41 and the ice cube 94 is scraped by the scrapping blade 811 and the scrapped ice drop into the lower bowl 10 through the slit 810. The desired kinds of jams drop on the scrapped ice through the holes 830 so that an ice dessert is made.

A first gear 51 is rotatably disposed on the first collar 310 of the disk 30 and has a polygonal hole 510 defined therethrough which communicates with the central hole 31 so that the first shaft 41 extends through the polygonal hole 501 and the first gear 51 is rotated with the first shaft 41. A gear set 53 including a second gear 530 and a third gear 531 is rotatably mounted to the third collar 33 wherein the third gear 531 is engaged with the first gear 51 and the second gear 530 is a small gear compared with the third gear 531. A second shaft 50 has a first end extending through the second hole 221 and a second end with a fourth gear 520 disposed thereto which is engaged with the second gear 530. Accordingly, when the crank member 60 is moved from the first shaft 41 to the second shaft 50 and rotates the second shaft 50, the rotational speed of the first shaft 41 will be increased so as to shorten a processing time.

Figure 4:
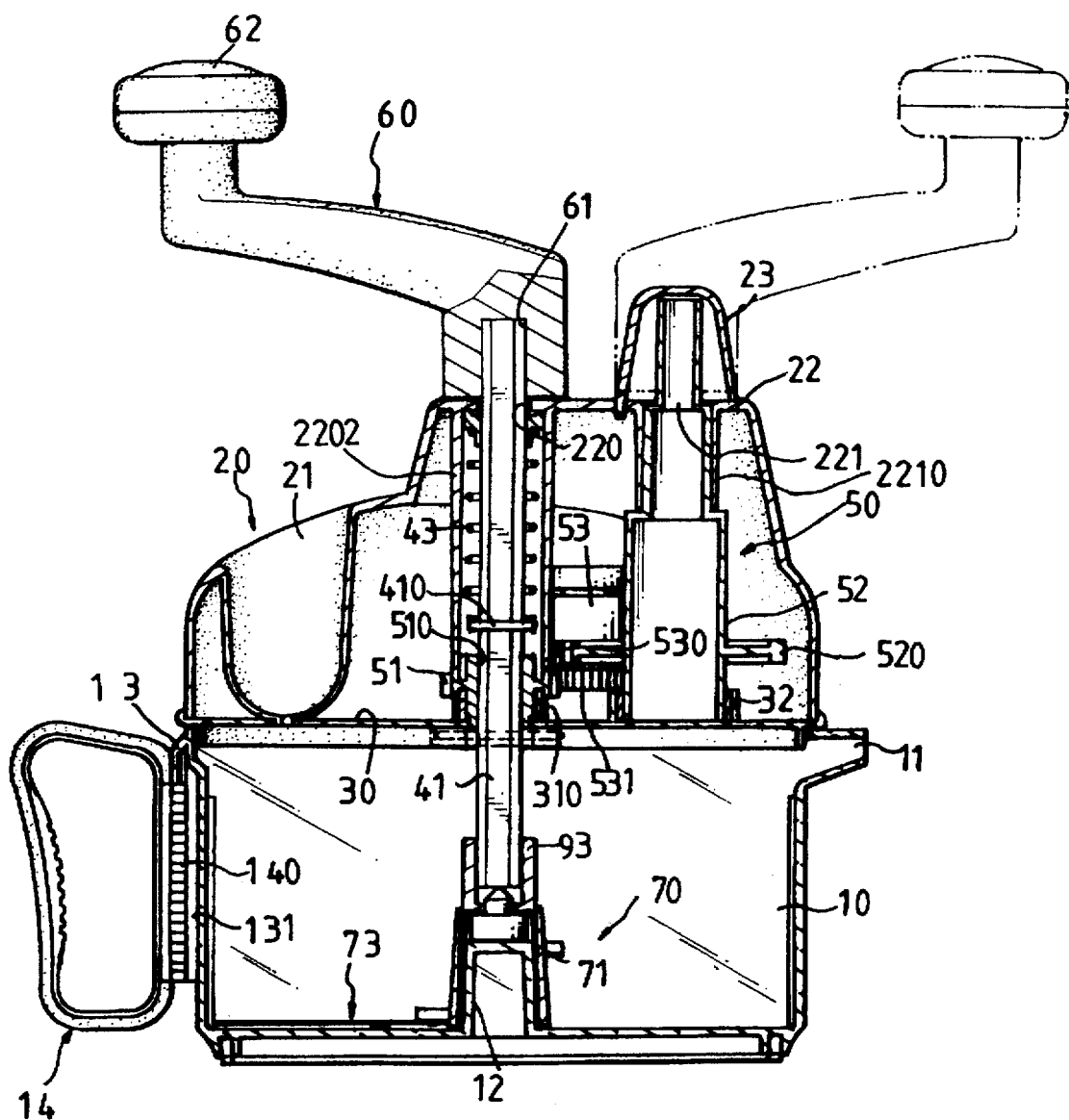
FIG. 4 is a side elevational view, partly in section, of the food processor when a mediate bowl is removed.

Referring to FIG. 4, the mediate bowl 80 can be removed and the disk 30 is mounted to the lower bowl 10 directly. The blade means 70 rotatably mounted on the protrusion 12 has a second polygonal recess 74 defined in a top thereof so as to receive the second end of the first shaft 41 so that when rotating the crank member 60, the blade means 70 is rotated and performs functions as those well known conventional food processors.

Although the invention has been explained in relation to its preferred embodiment, it is to be understood that many other possible modifications and variations can be made without departing from the spirit and scope of the invention as hereinafter claimed.

What is claimed is:

1. A food processor comprising:

a lower bowl having a first bottom and a first peripheral wall extending from said bottom, a protrusion extending from an inner side of said first bottom for a blade means rotatably mounted thereto;

a mediate bowl having a second bottom and a second peripheral wall extending from said second bottom, a slit defined in said second bottom and a scrapping blade fixedly and inclinedly disposed to said second bottom wherein a sharp edge of said scrapping blade extends above an inner side of said second bottom and is located adjacent to said slit, an outer peripheral wall disposed around said second peripheral wall with a plurality of connecting plates connecting between said second peripheral wall and said outer peripheral wall which is mounted to said first peripheral wall;

a disk disengagably mounted to said mediate bowl and having a central hole defined therethrough;

a cap mounted to said disk and having a first hole defined therethrough;

a first shaft having a polygonal cross section and having a first end extending through said first hole of said cap and a second end extending through said central hole of said disk, a fixing plate disengagably connected to said second end of said first shaft, a flange extending radially from said first shaft so that a spring is mounted to said first shaft and biasedly disposed between said flange and an inner flange extending inwardly and radially from an inner periphery defining said first hole, and a crank member having a first end with a first polygonal recess defined therein so as to securely mount to said first end of said first shaft and rotate said shaft.

2. The food processor as claimed in claim 1 wherein said blade means has a second polygonal recess defined in a top thereof so as to receive said second end of said first shaft.

3. The food processor as claimed in claim 1 wherein a handle is disengagably attached to an outer periphery said first peripheral wall.

4. The food processor as claimed in claim 3 wherein said first peripheral wall has an inverted U-shaped bracket disposed to said outer periphery thereof, said bracket having an open bottom end and a space defined between said first peripheral wall and said bracket, at least one tapered rib extending from said outer periphery of said first peripheral wall, said handle having at least one T-shaped member extending laterally therefrom so that said T-shaped member is inserted into said space and being securely positioned between said tapered rib and said bracket.

5. The food processor as claimed in claim 1 wherein each of said connecting plates extends perpendicularly to said outer peripheral wall and said second peripheral wall, a plurality of holes defined in each of said connecting plates.

6. The food processor as claimed in claim 1 wherein a first gear is rotatably disposed on said disk and has a polygonal hole defined therethrough which communicates with said central hole so that said first shaft extends through said polygonal hole, said cap having a second hole defined therein, a gear set rotatably on said disk and having a second gear and a third gear which is engaged with said first gear, a second shaft having a first end extending through said second hole and a second end with a fourth gear disposed thereto which is engaged with said second gear.

7. The food processor as claimed in claim 1 wherein said lower bowl has a pouring outlet defined in said first peripheral wall.

* * * * *